D. M. BLISS.
ALTERNATING CURRENT MOTOR.
APPLICATION FILED MAR. 13, 1911.

1,126,363.

Patented Jan. 26, 1915.

Witnesses:

Inventor:
Donald M. Bliss
by Frank L. Dyer
his Atty.

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

ALTERNATING-CURRENT MOTOR.

1,126,363.  Specification of Letters Patent.  Patented Jan. 26, 1915.

Application filed March 13, 1911. Serial No. 614,277. REISSUED

*To all whom it may concern:*

Be it known that I, DONALD M. BLISS, a subject of the King of Great Britain, and a resident of West Orange, in the county of Essex and State of New Jersey, have invented certain new and useful Improvements in Alternating-Current Motors, of which the following is a specification.

My invention relates generally to alternating current motors, and more particularly to motors adapted to be operated synchronously from a single phase alternating current circuit.

The object of my invention is to produce a simple, efficient, self-starting synchronous motor, adapted to operate on a single phase circuit.

My improved motor is particularly adapted for driving devices, such as mechanical rectifiers, for commutating alternating current waves into unidirectional currents, and for any other purposes in which exact synchronism with an alternating current is desired.

In the operation of mechanical rectifiers, it is important to maintain perfect synchronism, and also to be able to adjust the angular position of the rotor of the motor, and the rectifying devices connected thereto, with respect to the phase of the alternating current which is being rectified in order that the rectifying device may operate without sparking.

A further object of my invention is to provide a motor in which this adjustment may be easily and effectively made.

My improved motor comprises a field structure or stator, provided with a suitable exciting winding, and a rotor consisting of a core of magnetic material provided with a commutated winding and a short circuited system of conductors, the core having axially extending slots which divide it into sections or polar projections, equal in number to the poles of the field structure. The commutated winding is connected to the segments of a commutator, and suitable brushes are provided for the commutator. The brushes are preferably short circuited, but my invention is not limited to this arrangement of connections.

My invention consists further in the details of construction and combinations of parts, hereinafter more particularly described and claimed.

In some aspects my present invention is an improvement on that described in my copending application Serial No. 614,276 filed on even date herewith.

Figure 1:
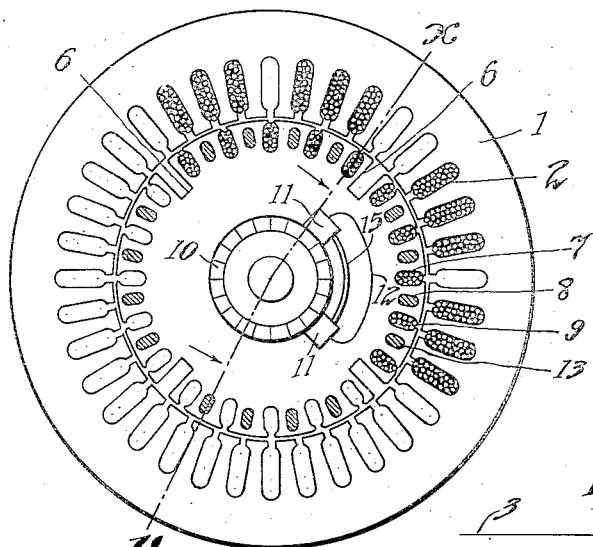
Figure 2:
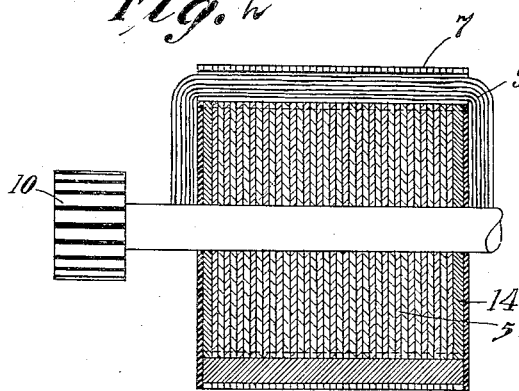
Figure 3:
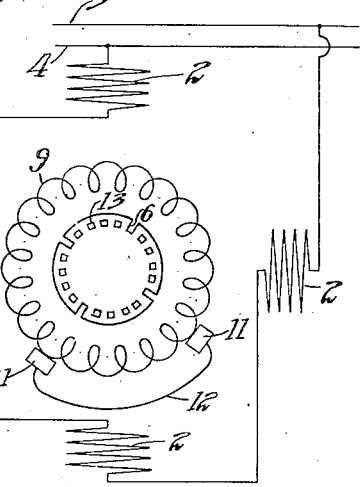
Figure 4:
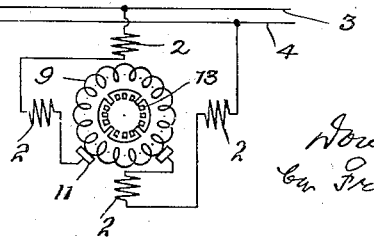

In the accompanying drawings which form a part of this specification, and in which like reference characters refer to like parts in the several views:—Figure 1 is a view partly diagrammatic and partly sectional of an alternating current motor embodying my invention; Fig. 2 is a view partly in section of the rotor of the same taken on the line X Y of Fig. 1, and with only one coil of the commutated winding shown; Fig. 3 is a diagrammatic view of the motor showing the same connected to the alternating current mains; and Fig. 4 is a diagrammatic view similar to Fig. 3 but showing a modified arrangement of connections.

Referring to the drawings, the stator, or field frame, of the alternating current motor is shown at 1. The field frame may be of any of the forms well known in the art and is preferably laminated. It may or may not have projecting poles, and is provided with a suitable winding 2, which may be either distributed or concentric. In the drawings, I have illustrated a four pole motor, with the windings on two of the poles omitted, but obviously my invention is applicable to motors of any number of poles. In Fig. 3 of the drawings, the field winding 2 is shown connected to the alternating current mains 3, 4.

The rotor, or armature of the motor is mounted to rotate within the influence of the field produced by the winding 2, and comprises a core 5 of magnetic material which is preferably cylindrical in form and laminated. The core is provided with three sets of axially extending openings at or near its periphery, and preferably uniformly distributed. The set of openings 6 consists of deep slots, which extend across the face of the rotor and may be parallel with the axis of the rotor, or slightly spiraled so as to aid the motor in starting. The slots 6 are uniformly distributed and divide the face of the rotor into as many sections as there are poles in the field structure. Each of these sections constitutes a polar projection of the rotor; and these sections or polar projections contain the remaining sets of openings 7 and 8. The openings 7 are uniformly distributed around the rotor and contain a commutated winding 9. The openings 7 are shown as slots nearly closed, but may be of any form suitable to contain the commutated winding. The commutated winding 9 may be any form of closed coil armature winding and is connected in the usual manner to the segments of the commutator 10. The commutated winding 9 is preferably of high resistance and is insulated from the core. The commutator is provided with brushes 11, which are preferably short circuited as by the conductor 12. My invention, however, is not limited to the arrangement of connections shown in Fig. 3 in which the brushes are short circuited, but a series connection may be employed, that is, the field winding and the commutated winding may be connected in series through the brushes across the line, as is illustrated in Fig. 4. The third set of openings 8 carry the active conductors of a squirrel cage system of conductors or windings, which consist preferably of bars 13 of copper or other conducting material, which are united at their ends by disks, or rings, 14 of copper, or other conducting material. The openings 8 are shown as tunnels containing the bars 13, but obviously any suitable form of opening may be employed. The openings 8 with their bars 13 are located between the openings 7 containing the commutated winding, except at those points where the deep slots 6 occur. At these points the bars of the squirrel cage system of conductors are omitted. The squirrel cage winding has preferably an even number of bars in each section or polar projection of the rotor. The brushes 11 may be mounted on an adjustable arm or ring, 15, so that they may be shifted around the commutator, thus varying the line of commutation.

The mode of operation of my improved motor is in brief as follows: When an alternating electromotive force is impressed on the field winding, the motor starts as a repulsion motor, and when it has reached a speed near synchronism, it drops into exact synchronism and is maintained at synchronous speed by the combined inductive effect of the field on the sections or polar projections of the rotor and the squirrel cage winding. The angular position of the rotor, with respect to the impressed alternating electromotive force, may be shifted forward or backward by shifting the brushes forward or backward, and thus changing the line of commutation. My improved motor is therefore particularly adapted for the operation of a rectifying commutator. Inasmuch as the commutated winding is of high resistance, the starting current is relatively small. Furthermore, it is to be noted, that in the arrangement of windings described, the commutated winding is surrounded by the squirrel cage system of short circuited conductors. The effect of this arrangement is to suppress sparking at the commutator, even when the brushes are displaced considerably from the line of normal commutation.

Having described my invention, what I claim as new and desire to secure by Letters Patent is as follows:

1. An armature comprising a core of magnetic material, having polar projections, and provided with a short circuited system of conductors and a commutated winding, and a commutator and short circuited brushes for the commutated winding, substantially as described.

2. An armature comprising a core of magnetic material having polar projections and provided with a short-circuited system of conductors and a comutated winding, and a conductors and a distributed commutated winding, substantially as described.

3. An armature comprising a core of magnetic material having two sets of axially extending openings, near the periphery thereof, and substantially equidistant therefrom, a closed circuited winding in one of said sets of openings and a commutated winding in the other of said sets, the said core having also an additional set of axially extending openings, whereby polar projections are formed, substantially as described.

4. In an alternating current motor, a core of magnetic material having uniformly distributed axially extending openings near the periphery thereof, a uniformly distributed commutated winding in some of said openings, and a short circuited system of conductors in some, but not all, of the remaining openings, substantially as described.

5. In an alternating current motor, the combination with a field frame or stator having poles, of a rotor comprising a core having polar projections equal in number to the poles of the stator, the said core being provided with a uniformly distributed commutated winding and a short circuited winding, substantially as described.

6. A synchronous motor having stator and rotor members of magnetic material, one of said members being provided with a primary or inducing winding, and the other of said members being provided with two secondary or induced windings, one being a commutated winding uniformly distributed, and the other being a short circuited winding having its active conductors arranged in spaced-apart groups equal in number to the number of poles produced by the primary or inducing winding, the space between any two adjacent groups being greater than the space between any two adjacent active conductors of a group, substantially as described.

7. A synchronous motor having a stator and a rotor, one of said members having a primary or inducing winding, and the other of said members having two secondary or induced windings, one being a commutated winding uniformly distributed, and the other a short circuited winding having its active conductors arranged in spaced apart groups equal in number to the number of poles produced by the primary or induced winding, the space between any two adjacent groups being greater than the space between any two adjacent active conductors of the group, and a commutator and adjustable short-circuited brushes for the commutated winding, substantially as described.

8. A synchronous motor, having a stator and a rotor, one of said members having a primary or inducing winding, and the other of said members having two secondary or induced windings, one being a commutated winding uniformly distributed, and the other a short circuited winding having its active conductors arranged in spaced-apart groups equal in number to the number of poles produced by the primary or inducing winding, the space between any two adjacent groups being greater than the space between any two adjacent active conductors of a group, and means for determining and shifting the axis of commutation of the commutated winding, substantially as described.

9. An armature comprising a core of magnetic material having polar projections and provided with a short-circuited system of conductors and a commutated winding, the active conductors of said system and winding being located in the faces of the polar projections, substantially as described.

10. In an alternating current motor, the combination with a field frame or stator adapted to be energized by alternating current, of a rotor comprising a core of magnetic material having polar projections and provided with a short-circuited system of conductors and a distributed commutated winding, and means for adjusting the angular position of the rotor with respect to the impressed alternating electromotive force, substantinally as described.

This specification signed and witnessed this 10th day of March 1911.

DONALD M. BLISS.

Witnesses:
 FREDERICK BACHMANN,
 ANNA R. KLEHM.